United States Patent
Lutz

(10) Patent No.: US 6,623,190 B1
(45) Date of Patent: Sep. 23, 2003

(54) METHODS AND APPARATUS FOR MANAGING A PRINT JOB AMONG A PROCESSOR, AN IMAGE PRODUCING DEVICE, AND AN EXTERNAL STORAGE DEVICE

(75) Inventor: Todd Alexander Lutz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/137,394

(22) Filed: May 3, 2002

(51) Int. Cl.[7] .............. B41J 11/44; B41J 5/30; B41J 21/17; B41B 15/00; G06K 15/00
(52) U.S. Cl. ............. 400/76; 400/61; 400/70; 358/1.1; 358/1.9; 358/1.14; 358/1.15; 358/1.17
(58) Field of Search ............... 400/76, 61, 70; 358/1.15, 1.16, 1.1, 1.14, 1.9, 1.17

(56) References Cited

U.S. PATENT DOCUMENTS

| | | | | | |
|---|---|---|---|---|---|
| 4,970,554 | A | * | 11/1990 | Rourke | 399/84 |
| 5,140,675 | A | * | 8/1992 | Okada | 358/1.15 |
| 5,559,933 | A | * | 9/1996 | Boswell | 358/1.15 |
| 5,764,863 | A | | 6/1998 | Fall et al. | 358/1.13 |
| 5,832,191 | A | * | 11/1998 | Thorne | 358/1.15 |
| 5,903,733 | A | * | 5/1999 | Hong | 709/232 |
| 6,031,624 | A | * | 2/2000 | Murphy | 358/1.17 |
| 6,160,629 | A | | 12/2000 | Tang et al. | 358/1.1 |
| 6,512,592 | B1 | * | 1/2003 | Simpson et al. | 358/1.15 |

* cited by examiner

*Primary Examiner*—Andrew H. Hirshfeld
*Assistant Examiner*—Wasseem H. Hamdan

(57) ABSTRACT

Printing a print job on an image producing device by storing print data from the print job to an external storage device, retrieving the print data from the external storage device to the image producing device, and generating an image for the print job using the image producing device.

1 Claim, 6 Drawing Sheets

METHODS AND APPARATUS FOR MANAGING A PRINT JOB AMONG A PROCESSOR, AN IMAGE PRODUCING DEVICE, AND AN EXTERNAL STORAGE DEVICE

Reference is made to Hewlett Packard application no. 10017582-1 entitled "PRINTING SYSTEM UTILIZING EXTERNAL STORAGE" by Samuel Lester and Jimmy Sfaelos (a different inventive entity) which is assigned to the assignee of the present invention and filed as of the same date as the present application.

TECHNICAL FIELD

The present invention relates generally to methods and apparatus for producing images.

BACKGROUND ART

There are many electronic devices capable of generating data for image production on print media. This general class of document generators includes such devices as computers, facsimile machines, digital cameras and copiers, medical imaging devices, optical scanners, satellite imaging devices, scientific data collection devices, etc. It is known among these types of devices to employ a single processor to perform the various data collection, organization and print request functions. Unfortunately, when the processor is busy processing a print request it is unavailable for other tasks.

For instance, typically a personal computer user requests a copy of a document and then waits while the print job is sent over the computer network to a printer, the printer processes the print job and sends the print job to print engine for image production. Where multiple copies of a print job are requested, the printer processes each of these copies as a separate print job. The printer may include an internal storage device such as a hard drive for storage of forms, fonts, print jobs, and/or temporary files generated when printing multiple copies of a print job.

In network environments, a single computer or server may be dedicated to the task of printing. This computer is provided with printer spooler software which queues print jobs and the individual print jobs are sent to the printer as the printer becomes available. If multiple copies are requested, the spooler typically stores the requested number of copies, each copy being essentially a separate print job.

Valuable time is wasted in processing each print job each time the print job is sent to a printer and reprocessing each print job where multiple copies are being printed. Processing uses up printer time and makes the printer busy. While the printer is busy, the user may have to wait.

SUMMARY

In one embodiment according to a system of the present invention, there is provided a printing system including a processor configured to generate a rasterized print job from a print job. The system may also include a storage device coupled to the processor and configured to store the rasterized print job, said storage device being external to any image producing device.

In another embodiment according to a method of the present invention, there is provided a plurality of steps including receiving a print job from an external storage device and generating an image for the print job using an image producing device.

BRIEF DESCRIPTION OF THE DRAWINGS

Features of the present invention will become apparent to those skilled in the art from the following description with reference to the figures, in which.

DETAILED DESCRIPTION OF PREFERRED EMBODIMENTS

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation.

Figure 1:
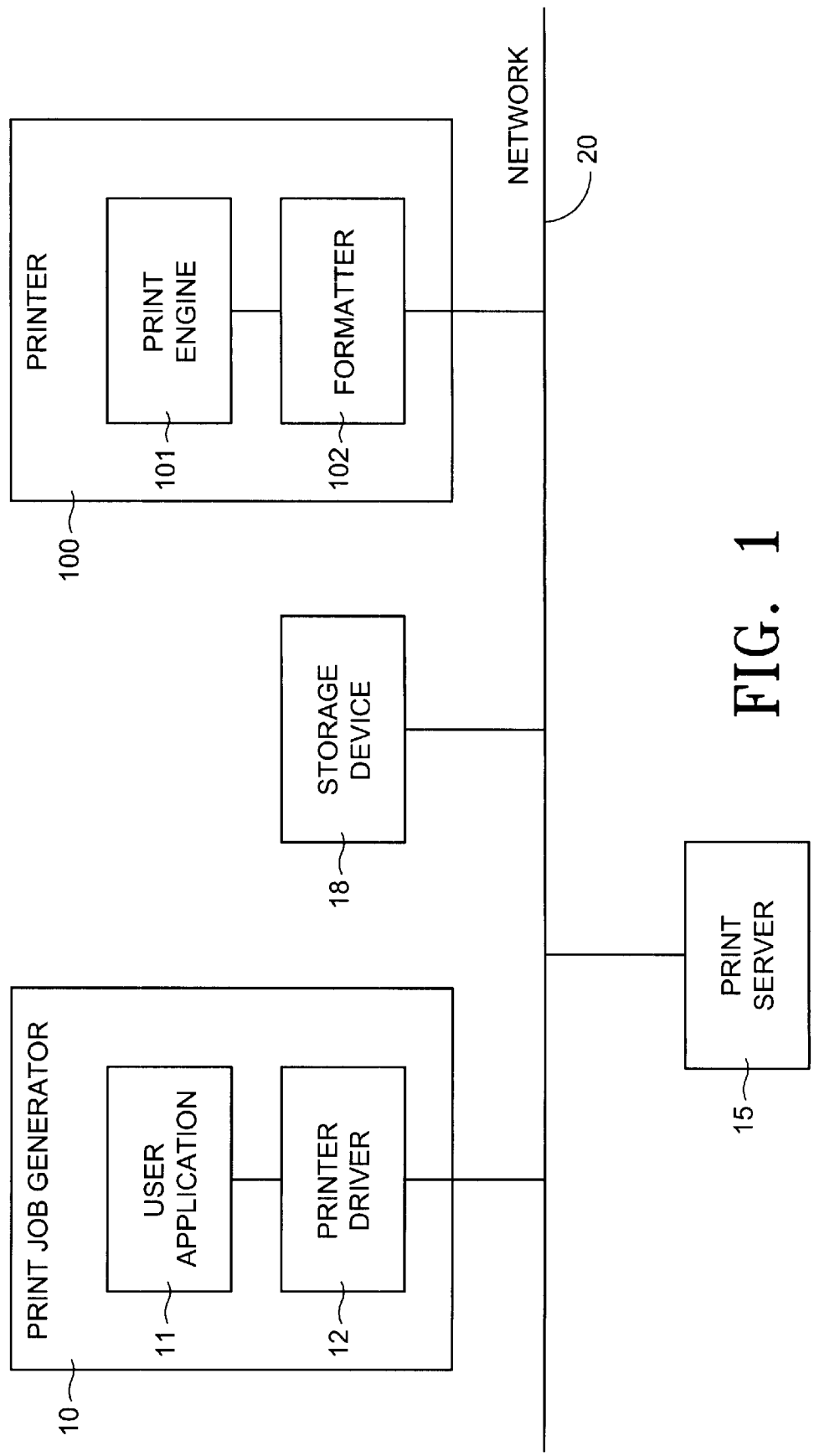
FIG. 1 is an exemplary schematic representation of a system for producing images on print media according to an embodiment of the present invention.

FIG. 1 depicts a print job generator 10, a print server 15, a storage device 18, and an image producing apparatus such as a printer 100 all interconnected through a network 20, according to an embodiment of the present invention. A print job is any set of instructions in any media for enabling display of textual, graphic, symbolic, photographic, etc. images in any medium including printed paper documentation, electronic display, and the like.

In one embodiment, print job generator 10 has a document generating software application (labeled user application) 11 and an associated printer driver 12 in a memory (not shown). Collectively, these define one possibility for source document and/or print job generation. Print job generator 10 could be any of a variety of different devices, such as a personal computer, a handheld computer (e.g., a person digital assistant), a facsimile machine, or any other device capable of sending a print job in a format that requires further processing before it may be utilized by a print engine, including those previously described. Alternatively, functionality of the print job generator 10 may be provided through some device on the network 20, for instance part of a database existing on the Internet.

Print server 15 is a device that operates in conjunction with the network 20 to facilitate the printer's 100 handling of multiple print jobs. Print server 15 may be used with printer spooler software to queue print jobs on a storage device, such as storage device 18, or a storage device internal to the print server 15, and send the print jobs to a printer 100 as the printer 100 becomes available. Print server 15 may also be configured to receive a print job from the print job generator 10 over network 20 and determine whether the print job is stored on a storage device 18 as a rasterized print job. The print server 15 may then either retrieve the rasterized print job from the storage device 18, or have the storage device 18 send the rasterized print job to an image producing apparatus such as printer 100, or send the print job to a processor (not shown) for processing into a new rasterized print job. As used herein, a processor is any electronic device for receiving, storing, handling, interpreting, modifying, executing, etc. electronic data or instructions of any kind. The print server 15 may also be configured to direct the storage device 18 to store the new rasterized print job. Thus, the storage device 18 may be used to store print jobs in either a rasterized or unrasterized format.

Storage device 18 is suitable for storing, and later retrieving, data representing a print job, such as the rasterized version of a print job, or a plurality of such print jobs. In addition to storage of print jobs, storage device 18 may also be used for storage of forms, and/or temporary files generated when printing multiple copies of a print job. In one embodiment, storage device 18 has a capacity of over 1 gigabyte available for electronic storage and is external to any image producing device, such as printer 100. Storage device 18 may have a much greater capacity. Being external to the printer 100 may facilitate easy removal, replacement, upgrades, and repair of the storage device 18, without disturbing the printer 100. External, as used herein, should be interpreted according to its ordinary meaning but may also include the quality of one thing being remotely located with respect to another thing. Further, the overall cost of a printer 100 that includes its own storage device 18 is increased in comparison with the cost of a printer 100 without such a storage device 18.

Storage device 18 includes a number of features making it convenient and relatively easy to use. For example, storage device 18 may be configured to receive forms, fonts, print jobs, temporary files generated when printing multiple copies of a print job, and/or other data from a printer 100. Preferably, storage device 18 could be installed in the network 20 using any of a variety of suitable means for installing similar devices into networks.

Network 20 is preferably a relatively high-speed, high-throughput network. In one embodiment, network 20 generally operates at speeds transmitting over one megabit of data per second, in another embodiment, network 20 operates at speeds averaging at least 10megabits per second. In yet another embodiment, network 20 may operate at speeds approaching and exceeding a gigabit per second. It is, however, contemplated that the network 20 of the present invention can operate at any speed desired and is not restricted to the preferred speeds above.

Network 20 serves to put two or more devices in communication with each other, such that data may be transmitted between the devices. Network 20 may be implemented as a local area network, a wide area network (e.g., an network in communication with the Internet) or a combination thereof. The connection between the devices could be a direct electronic connection using a parallel or serial cable or a connection via a telecommunications link, or an optical, infrared, or a radio frequency link or a combination thereof. The network 20 may be further configured to support wired protocols (e.g., Transmission Control Protocol/Internet Protocol, EEE 802.5, Asynchronous Transfer Mode, etc.), wireless protocols (e.g., Cellular Digital Packet Data, MOBITEX, IEEE 801.11b, etc.) or combinations thereof.

Exemplary storage devices 18 include computer system RAM (random access memory), ROM (read only memory), EPROM (erasable, programmable ROM), EEPROM, and magnetic or optical disks or tapes. The storage device 18 may be any device capable of storing computer readable signals for later retrieval. ROM-based storage devices 18 may generally be used in those applications involving data that does not need to be changed frequently.

Generally, printer 100 has a print engine 101 connected to a controller or formatter 102 that receives data from the network 20. Printer 100 may include any sort of image producing device and is generally configured to house a processor (not shown).

Figure 2:
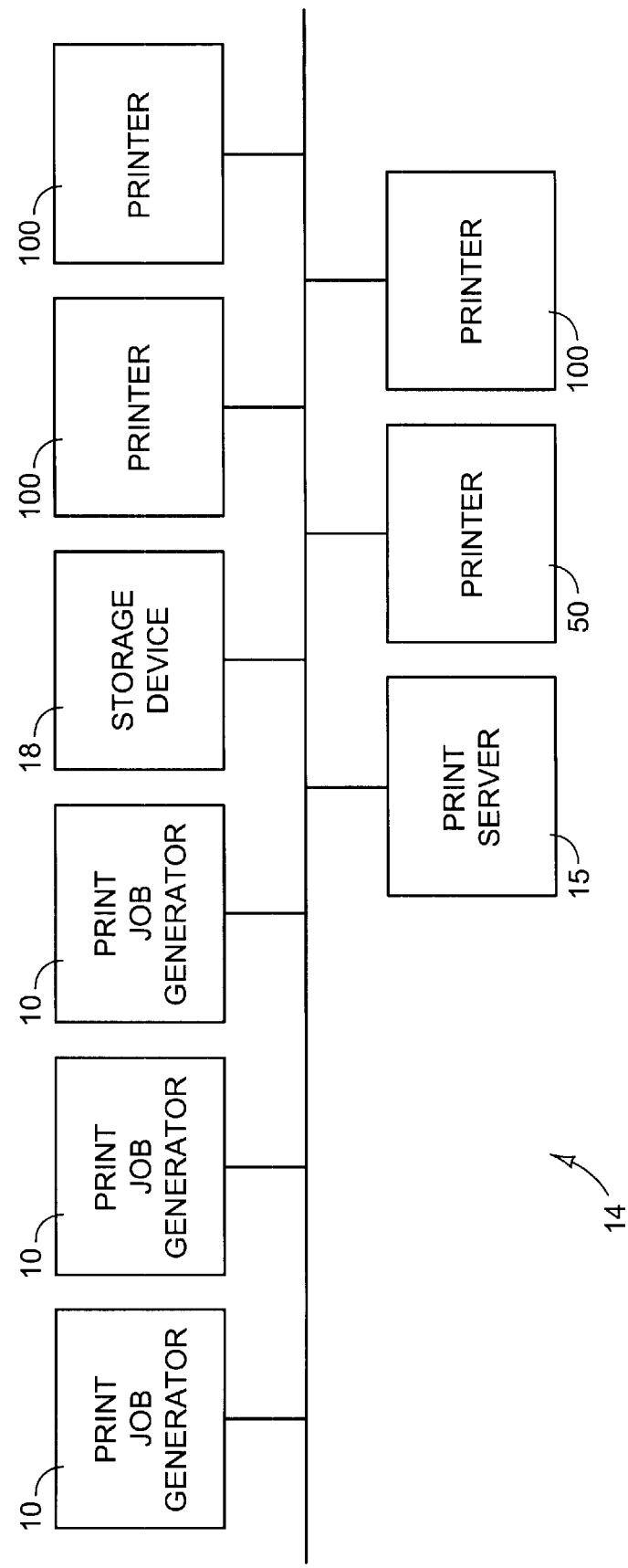
FIG. 2 is an exemplary schematic representation of another system for producing images on print media according to another embodiment of the present invention.

FIG. 2 shows an embodiment of a system 14 similar to that depicted in FIG. 1. In FIG. 2, a plurality of print job generators 10 are shown in communication with network 20. A plurality of printers 50 and 100 are also shown in communication with network 20. Thus, it may be appreciated that print server 15 and storage device 18 may be configured for use with multiple print job generators 10 and multiple printers 50 and 100.

Such an embodiment might be used to permit the printers 100 to share information with each other, or with other components on the network 20 via the storage device 18. For instance, this embodiment could be used to facilitate parallel printing to achieve greater throughput using a plurality of printers 50 and 100. In such an embodiment, one printer may serve as a master printer 50 with one or more printers 100 being subservient to the master printer 50. When a print job, be it a conventional print job or a rasterized print job, of a predetermined size is sent to the master printer 50, this master printer 50 may then determine that the print job should be split into separate segments to be printed among multiple printers 50 and 100. The master printer 50 could then send the print job to the storage device 18 with an instruction that the print job be split into separate segments to be printed among multiple printers 50 and 100. Alternatively, the print job may already be on the storage device 18, and the master printer 50 could send an instruction to either of the storage device 18 or the subservient printers 100, using the network 20. The subservient printers 100 may then receive or retrieve the print job from the storage device 18 and perform a given segment of the print job. Alternatively, the subservient printers 100 may receive the instruction to retrieve the print job directly from the storage device 18. In yet another alternative, the master printer 50 may send a print job directly to a subservient printer 100 through the network 20.

The printers 100 may be configured to periodically check a directory on the storage device 18 for instructions left by another printer 50, or another device on the network 20. Alternatively, or additionally, each of the printers 100 may be configured to check for such an instruction on a directory on the storage device 18 whenever that printer 100 becomes available.

In another embodiment, parallel printing may be achieved by segmenting the print job at either the host device 10, or at the print server 15, where one is employed. For instance, either of the host device 10 or print server 15 may be configured to segment any print job exceeding a predetermined number of pages. The segmented print job could then be sent to the storage device 18, where one or more of the printers 100 may later retrieve it. Such a print job may be sent to the storage device 18 along with an instruction to direct one or more of the printers 100 to retrieve that print job and execute it.

Figure 2A:
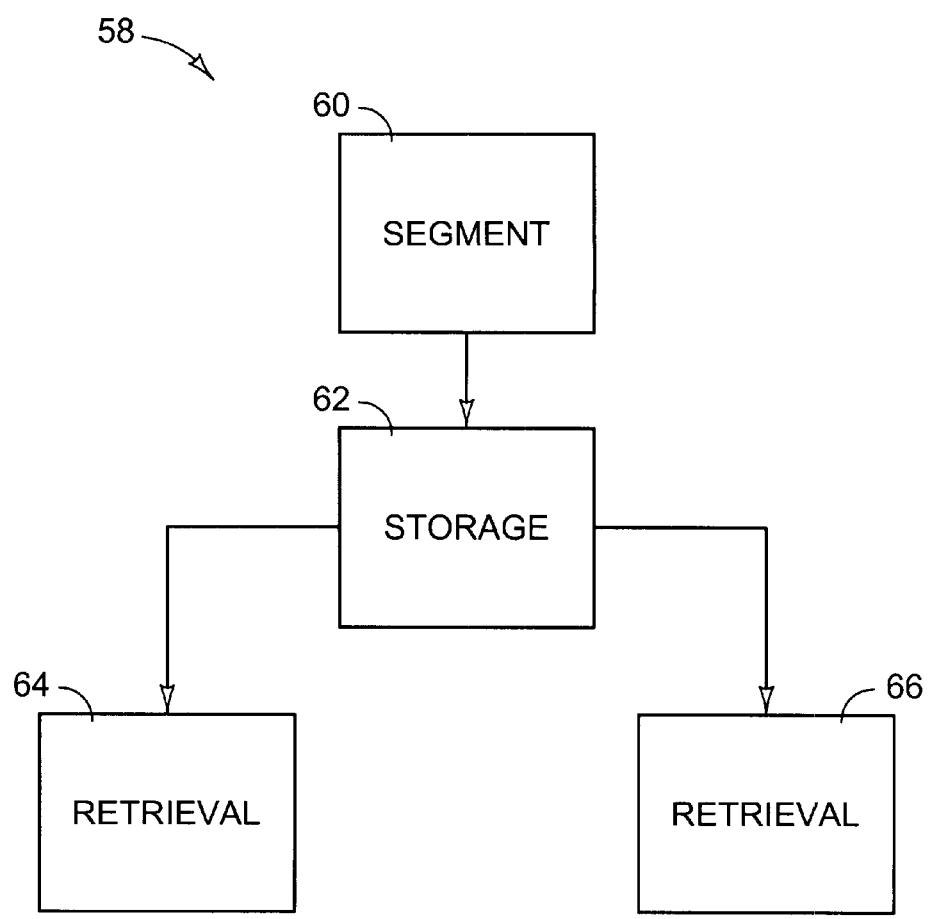
FIG. 2A is an exemplary flow diagram of a method in accordance with an embodiment of the present invention.

FIG. 2A shows an exemplary flow diagram of method 58 for an operational mode of a system such as that shown in FIG. 2 in accordance with one embodiment of the invention. It should be appreciated that this method may be practiced on any of a variety of systems, and is not limited to the arrangement depicted in FIG. 2. The method involves segmenting 60 a print job such that portions of a print job may be handled by separate printers. The segmented print job may then be stored 62 on an external storage device 18, where portions of the segmented print job may be separately retrieved 64 and 66 by different printers for rendering. These separate printers may retrieve 64 and 66 the portions of the segmented print job at the same or at different times.

In certain instances, the same printer may retrieve 64 a first portion of the segmented print job, and then may also retrieve 66 the second portion of the print job. For example, each printer on a network may be configured to check an external storage device, such as storage device 18, when that printer goes idle, or remains idle for a certain period of time. If one printer retrieves 64 and completes a first portion of a segmented print job stored on an external storage device 18 before any other printer becomes available, the first printer will check the external storage device and retrieve 66 the second portion of the segmented print job. While this method is depicted with a print job being segmented into two portions, it should be appreciated that a print job may be segmented into a wider variety of portions.

Figure 3:
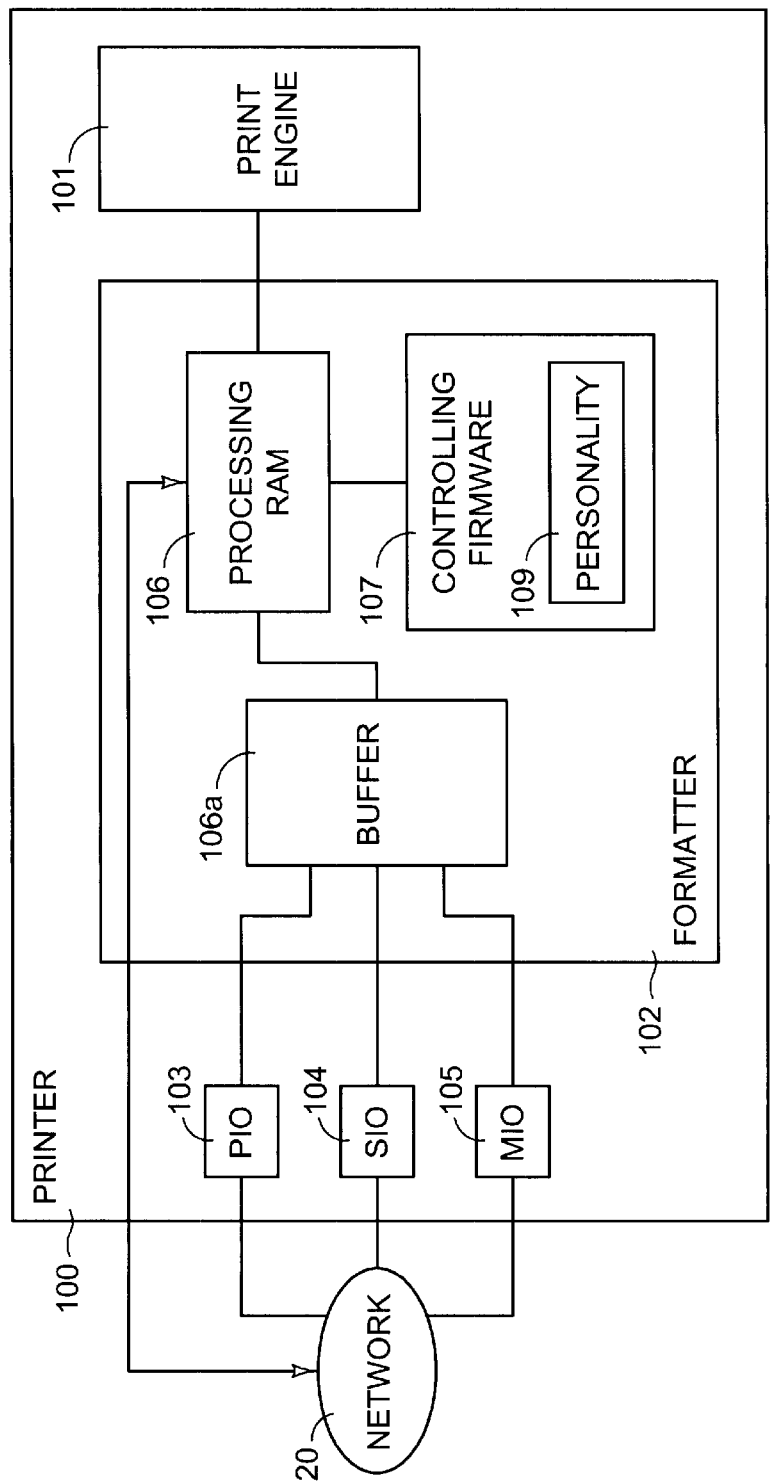
FIG. 3 is an exemplary schematic representation of a printer for use in accordance with an embodiment of the present invention.

FIG. 3 shows printer 100 in communication with network 20 such that the printer 100 is generally configured to send data to and receive data from the network 20. Printer 100 includes a formatter 102, which may receive data from a parallel input/output (PIO) port or channel 103, a serial input/output (SIO) port or channel 104, and a modular input/output (MIO) port or channel 105. Other types of inputs, including infrared and radio frequency couples are also compatible with the presently described embodiment of the invention.

Formatter 102 includes connections to the inputs, processing electronics, a buffer 106a, random access memory (labeled processing RAM) 106, read-only memory (ROM) (labeled controlling firmware) 107, and associated electronics connecting the formatter 102 to print engine 101. The controlling software or firmware for formatter 102 resides in ROM 107 (or EPROM, or EEPROM, or Flash memory), also referred to as firmware 107. A specific portion of this firmware 107 is referred to as the personality 109 which controls how the print job is rendered into a rasterized data stream. Personality 109 can, and often does, contain multiple personalities to render different kinds of print jobs. For example, there is often a separate personality for POSTSCRIPT print jobs and a separate personality for PCL print jobs. The present invention can be implemented in existing image forming devices by substituting a modified ROM 107 for the existing ROM in the existing image forming device.

RAM 106 may be used for several functions which can be generally classified as receiving and buffering incoming data (print jobs), detecting/retrieving stored rasterized print jobs, converting print jobs into a rasterized output stream (a rasterized print job) and buffering the rasterized data for output to print engine 101, and sending a rasterized version of the print job to print engine 101. RAM 106 may also send print jobs, or other data, including instructions to an external storage device 18. As data is received from the input, the data may be parsed to strip out different commands. These commands may be used by the formatter 102 to signal when to retrieve a print job from the storage device 18, or when the print job must be processed into a rasterized print job by the formatter 102. In one embodiment, print engine 101 may receive a rasterized print job directly from an external storage device 18.

In one embodiment, the formatter 102 is a processor. In addition to the previously described functions, in one embodiment, the formatter 102 may determine whether a print job is stored on a storage device in a rasterized format. This determination may be performed in a variety of ways. One method involves searching an index (not shown) of the storage device 18. In another method, each of the rasterized print jobs stored on the storage device 18 is associated with an identifier, such that the formatter 102 may retrieve a rasterized print job from the storage device 18 by requesting the print job by its associated identifier.

In another embodiment, a print job may include or may simply be an instruction for the formatter 102 to retrieve the rasterized print job from an external storage device, such as storage device 18. In such an embodiment, the formatter 102 is configured to detect, interpret, and act upon an instruction. It should be appreciated that the formatter 102 may be installed within its own device, external to the printer 100, or internal to the printer 100, or as part of an external storage device or server.

In yet another embodiment, the formatter 102 is configured to determine if, or respond to a signal that, a portion of a print job is stored on an external storage device in a rasterized format. In such an embodiment, the formatter 102 can then retrieve the rasterized portion of the print job, and process the remainder of the print job into a rasterized remainder portion, and merge the rasterized portion and the rasterized remainder portion into a single rasterized print job for a print engine, such as print engine 101.

Figure 4:
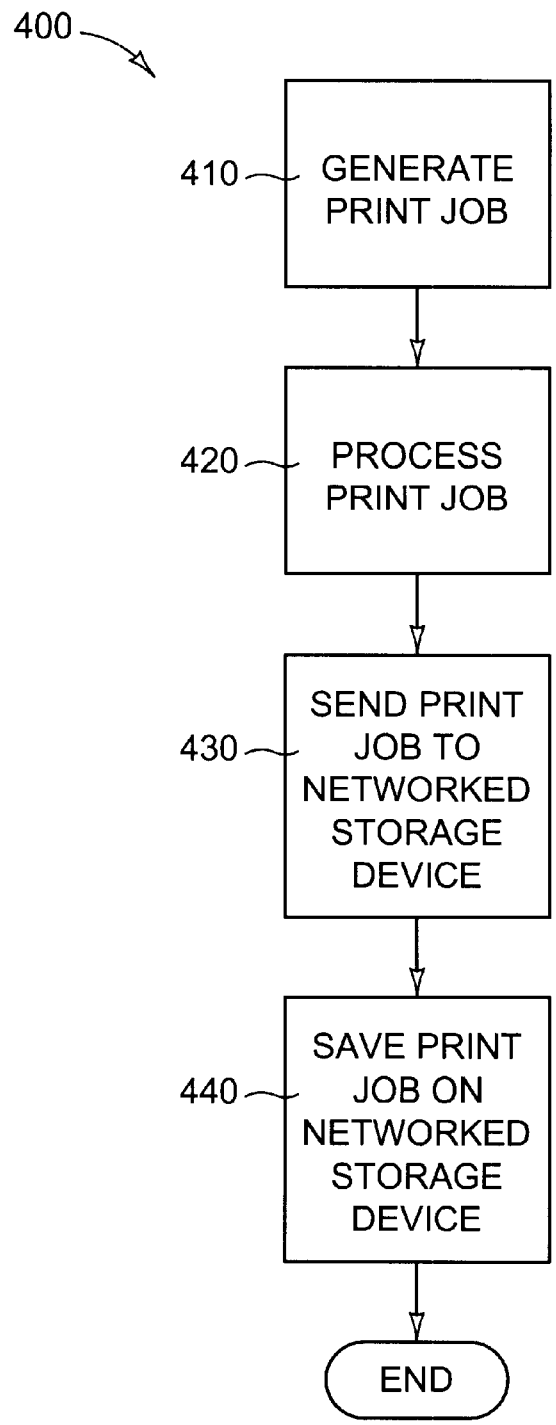
FIG. 4 depicts an exemplary flow diagram of method in accordance with one embodiment of the invention.

FIG. 4 depicts a flow diagram of method 400 for an operational mode of a system such as that shown in FIG. 2 in accordance with one embodiment of the invention. It should be appreciated that this method may be practiced on any of a variety of systems, and is not limited to the arrangement depicted in FIG. 2. This method is particularly suitable for use when a given print job has not been stored on a storage device 18. The method 400 may involve generating a print job, step 410. This step is typically conducted by a print job generator, which may be a computer, as previously described. The print job may then sent to a formatter or processor that conducts processing of the print job, step 420 into a rasterized format suitable for use by a print engine. The formatter may exist in a printer as shown in FIG. 3, or may be installed as part of a separate device, such as a print server, such that the separate device may be dedicated to, or otherwise be useful for, processing print jobs into a fully rasterized format.

The method then involves sending the print job to a networked storage device in step 430. As previously described, the networked storage device is an external component with relation to the print job generator. In certain embodiments, the method may include storing the print job 440 on an external storage device, such as storage device 18, in step 440.

In another embodiment, the method may include sending the print job to the storage device without any processing, such that the print job is stored on the storage device in an unrasterized format.

Figure 5:
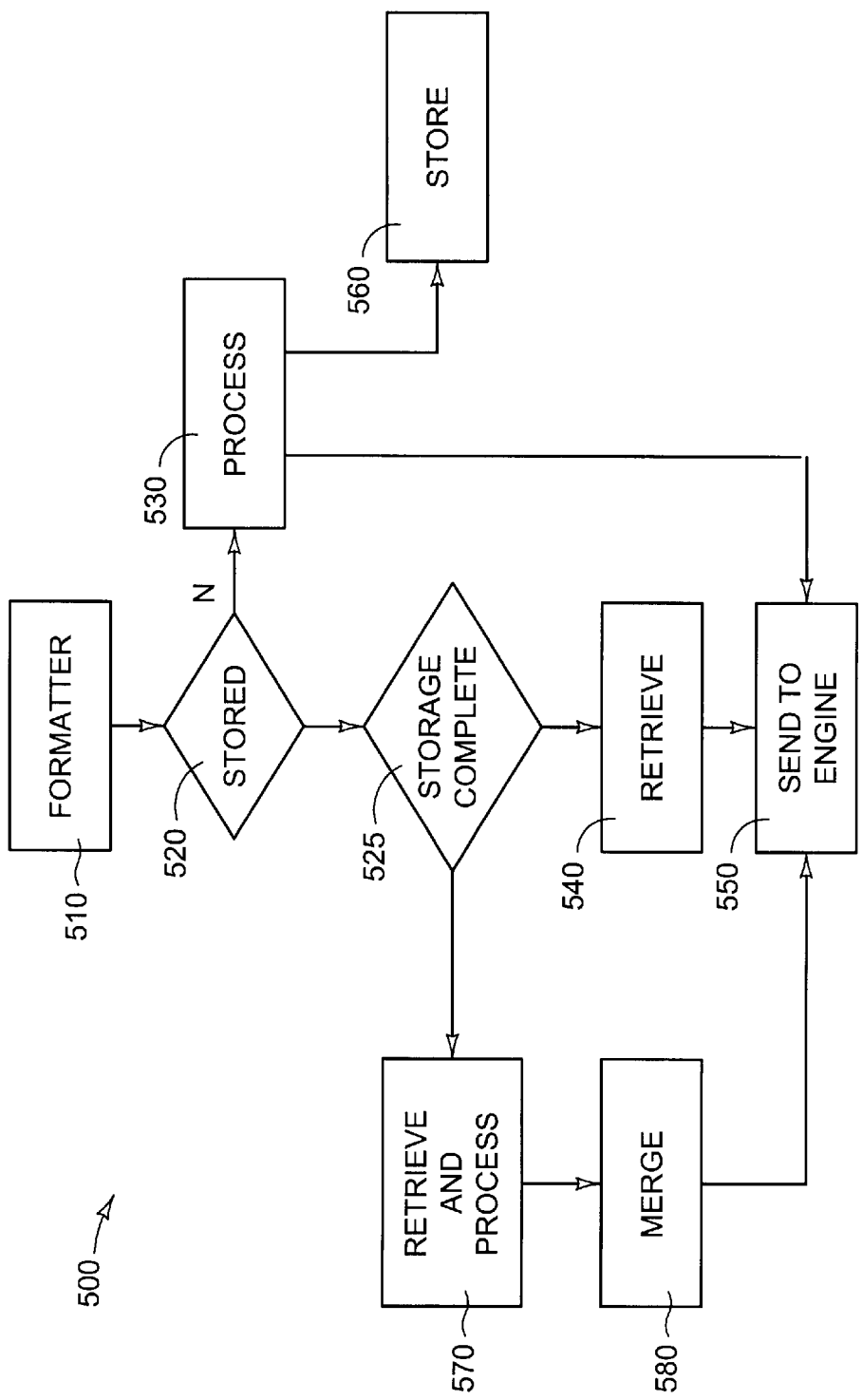
FIG. 5 depicts an exemplary flow diagram of another method in accordance with an embodiment of the invention.

FIG. 5 depicts a flow diagram of another method 500 for an operational mode of a system such as that shown in FIG. 2 in accordance with an embodiment of the invention. It should be appreciated that this method may be practiced on any of a variety of systems, and is not limited to the arrangement depicted in FIG. 2. In the method 500 of FIG. 5, a print job is received 510 by a formatter. The formatter may be in any of a printer, storage device, print server, or other networked device. The formatter determines 520 whether the print job is available, in whole or in part, in a rasterized format on an external storage device 18. If the formatter determines 520 that the print job is not fully available on an external storage device 18 in rasterized format, the formatter processes 530 the print job into a rasterized format. Once the formatter has the print job in a rasterized format, the rasterized print job may be sent 550 to a print engine to render a printed image. The print job may also be stored 560 on a storage device. In one embodiment, the formatter stores 560 the rasterized print job by sending it to an external storage device 18.

Although the diagram depicts storage of a rasterized print job, the storage device 18 may also be used to store unrasterized print jobs. For example, the form or letterhead may be stored in an intermediate (unrasterized) format. Such intermediate formats may take up less storage space than fully rasterized formats.

If the formatter determines 520 that the print job is available, at least partially, on an external storage device in rasterized format, the formatter then determines 525 if the print job is available, completely rasterized, on an external storage device 18. If the formatter determines 525 that the print is available, completely rasterized, on an external storage device 18, the formatter retrieves 540 the print job. Once the formatter has the print job in a rasterized format through step 540, the rasterized print job may be sent 550 to a print engine to render a printed image.

Where the formatter determines 525 that the print job is only partially available in a rasterized format on an external storage device 18, the method may also involve the steps of retrieving and processing 570 and merging 580. If the formatter determines 525 that a print job is incompletely stored or that part of a print job is stored in a rasterized format, it may retrieve that portion of the print job so stored from a storage device and then process the remainder of the print job 570. The formatter might then have two print jobs, the retrieved print job and the processed print job. These two print jobs are then merged 580 by the processor into a single print job that may be sent 550 to a print engine. These steps, 570 and 580, are of particular use where part of a print job involves a form, or letterhead, or some other commonly used image. This image may be stored on an external storage device, and later retrieved by the formatter whenever some content is provided for use therewith, for instance content for the form, or letter content for use with letterhead. These steps would save reprocessing that portion of the print job dedicated to the letterhead or the form. Alternatively, the letterhead or form may be stored on an external storage device in an unrasterized format. As with steps 530, and 540, once the formatter has the print job in a rasterized format, through step 580, the rasterized print job may be sent 550 to a print engine to render a printed image.

In one embodiment, step 550 may involve sending the print job to a variety of print engines, or image producing devices, such that the print job may effectively be printed simultaneously by a number of image producing devices. Such parallel printing may significantly reduce the time required for completing a print job. Large print jobs could be stored on the external storage device, then multiple image producing devices could be used simultaneously to print the job. For example, if a user required sixty copies of a document, and had three image producing devices sharing an external storage device, each of the three image producing device could print twenty copies simultaneously.

The step of determining 520 whether the print job is available in a rasterized format on an external storage device may involve detecting a signal indicating whether to retrieve the rasterized print job from an external storage device. The signal may be in a format similar to that used in the print job language, or other suitable printer control language. In another embodiment, the step of determining 520 whether the print job is available in a rasterized format on an external storage device would involve checking a directory to determine whether the rasterized print job is stored on an external storage device. The directory may be stored in any suitable location, for instance, as part of the external storage device, part of a print server, or otherwise.

In yet another embodiment (not shown), one or more partial print jobs may be retrieved from an external storage device in unrasterized format and merged with a print job received by a formatter in unrasterized format. Once these multiple partial print jobs are merged together, they may be processed into a fully rasterized format and then stored on an external storage device or sent to a print engine for rendering into a printed image, or both stored and rendered.

While the invention has been described with reference to certain exemplary embodiments thereof, those skilled in the art may make various modifications to the described embodiments of the invention without departing from the scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

What is claimed is:

1. A method for use in creating an image on print media said method comprising the steps of:

retrieving an existing rasterized print job from an external storage device;

generating an image from said rasterized print job using an image producing device;

receiving an instruction to conduct a print job and determining whether the print job is partially stored on an external storage device in rasterized or unrasterized form;

retrieving any portion of the print job that is stored on an external storage device in rasterized or unrasterized form;

processing any portion of the print job that is in unrasterized form into a rasterized form;

merging the rasterized portions of the print job into a single rasterized print job; and sending the merged print job to a print engine.

\* \* \* \* \*